United States Patent
Saada et al.

(10) Patent No.: US 10,065,549 B2
(45) Date of Patent: Sep. 4, 2018

(54) DEVICE FOR LOCKING A FOLDING ELEMENT IN POSITION FOR A VEHICLE SEAT

(71) Applicant: Expliseat, Paris (FR)

(72) Inventors: Benjamin Saada, Paris (FR); Jean-Charles Samuelian, Paris (FR); Vincent Tejedor, Issy les Moulineaux (FR); Alexandre Mangeot, Merignac (FR); Gilles Duval, Levallois Perret (FR)

(73) Assignee: EXPLISEAT, Paris (FR)

( * ) Notice: Subject to any disclaimer, the term of this patent is extended or adjusted under 35 U.S.C. 154(b) by 0 days.

(21) Appl. No.: 15/030,207

(22) PCT Filed: Oct. 21, 2014

(86) PCT No.: PCT/EP2014/072504
§ 371 (c)(1),
(2) Date: Apr. 18, 2016

(87) PCT Pub. No.: WO2015/059119
PCT Pub. Date: Apr. 30, 2015

(65) Prior Publication Data
US 2016/0250958 A1 Sep. 1, 2016

(30) Foreign Application Priority Data
Oct. 22, 2013 (FR) ...................................... 13 60293

(51) Int. Cl.
*A47B 39/00* (2006.01)
*B60N 3/00* (2006.01)
(Continued)

(52) U.S. Cl.
CPC .............. *B60N 3/004* (2013.01); *B60N 2/64* (2013.01); *B64D 11/0638* (2014.12)

(58) Field of Classification Search
CPC .......... B60N 3/004; B60N 3/00; B60N 2/206; B60N 2/2356; B60N 2/2358; B60N 2/235
(Continued)

(56) References Cited

U.S. PATENT DOCUMENTS 5,540,483 A * 7/1996 Marechal ................. B60N 2/23
297/169
6,347,590 B1 2/2002 D'Annunzio
(Continued)

FOREIGN PATENT DOCUMENTS

CH     356889 A    10/1961
EP   1 431 112 A1   6/2004
(Continued)

OTHER PUBLICATIONS

Search Report issued in French Patent Application No. FR 13 60293 dated Jun. 12, 2014.
(Continued)

*Primary Examiner* — Chi Q Nguyen
(74) *Attorney, Agent, or Firm* — Pearne & Gordon LLP (57) ABSTRACT

A device for locking a folding element in position for a vehicle seat including: a fixed element, designed to be fixed to the vehicle seat, a rotating element, designed to be fixed to the folding element, installed free to rotate relative to the fixed element about a rotation axis (X), the rotating element comprising at least a first locking structure, and a locking element, installed on the fixed element and that can be moved between a locking position in which it locks the rotating element in rotation relative to the fixed element by at least partial engagement of the locking element in the at least one first locking structure of the rotating element, and a release position in which it allows free rotation of the
(Continued)

rotating element from the fixed element by release of the locking element in the at least one first locking structure of the rotating element.

16 Claims, 5 Drawing Sheets

(51) Int. Cl.
  *B60N 2/64* (2006.01)
  *B64D 11/06* (2006.01)
(58) Field of Classification Search
  USPC ...... 297/163, 463.1, 188.06, 188.04, 188.01, 297/188.05, 169, 173
  See application file for complete search history.

(56) References Cited

U.S. PATENT DOCUMENTS

| | | | | |
|---|---|---|---|---|
| 8,517,464 B2* | 8/2013 | Ruiz | ...................... | B60N 3/004 297/146 |
| 8,881,659 B2* | 11/2014 | Ackeret | ................. | B60N 3/002 108/11 |
| 9,371,026 B2* | 6/2016 | Chang | .................... | B60N 3/002 |
| 2005/0045071 A1 | 3/2005 | Lindstrom | | |
| 2007/0145791 A1 | 6/2007 | Strasser | | |
| 2011/0006583 A1* | 1/2011 | Schwarze | .............. | B60N 2/206 297/463.1 |
| 2015/0061327 A1* | 3/2015 | Millan | .................. | B60N 3/004 297/163 |
| 2016/0046224 A1 | 2/2016 | Saada | | |

FOREIGN PATENT DOCUMENTS

| | | |
|---|---|---|
| EP | 2 646 318 | 10/2013 |
| FR | 2 831 496 A1 | 5/2003 |
| FR | 2 943 008 A1 | 9/2010 |
| WO | 2012/074787 A1 | 6/2012 |

OTHER PUBLICATIONS

International Search Report issued in Application No. PCT/EP2014/072504 dated Mar. 9, 2015.

Written Opinion issued in Application No. PCT/EP2014/072504 dated Mar. 9, 2015.

* cited by examiner

DEVICE FOR LOCKING A FOLDING ELEMENT IN POSITION FOR A VEHICLE SEAT

TECHNICAL FIELD

This invention applies to the field of passenger transport including public transport particularly by road, rail or air. It is more particularly applicable to the field of passenger seats, and particularly the field of folding elements installed on such seats.

The invention is thus related to a device for locking a folding element in position for a vehicle seat, a passenger vehicle seat comprising such a locking device, and a vehicle comprising such a seat.

STATE OF PRIOR ART

In the field of passenger transport, seats in transport vehicles are more and more frequently fitted with folding elements, and particularly trays that passengers can fold down or fold up depending on their needs. In particular, passengers can use such trays to eat, to work or for entertainment. They are useful as supports on which passengers can place all types of objects that they might use during their travel.

Safety standards for the design of folding elements installed on passenger seats, particularly in the case of trays, usually require a device to lock trays in the raised position. For the purposes of this description, the « raised position » refers to a position in which the folding element is not used, particularly when the folding element is in contact with the back face of the passenger seat back. Locking of trays in the raised position is also very desirable to assure the comfort and safety of passengers during their travel.

It is known that this can be achieved using mechanisms for locking the tray in the raised position, in contact with the back face of the passenger seat back.

Figure 1A:
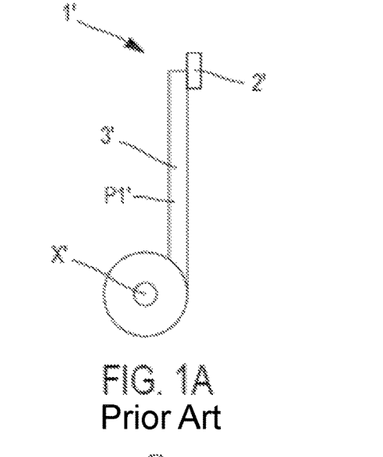
FIGS. 1A and 1B show a first example of a mechanism according to prior art for locking a vehicle seat tray in position.
Figure 1B:
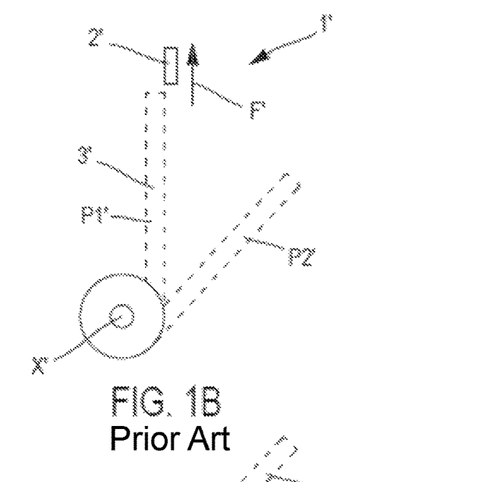

For example, FIGS. 1A and 1B show a first example of a locking device 1' using a movable latch 2'.

In FIG. 1A, the tray 3', mounted free to rotate about a rotation axis X' fixed to the seat, is in a raised position P1', and more precisely a vertical position P1', in contact with the back face of the seat back. The mechanism 1' for locking the tray 3' in the raised position P1' is provided by the existence of a latch 2', usually located near the top of the tray 3', that is connected to a fixed part of the seat. The installation of the latch 2' in contact with the external face of the tray 3', oriented along the direction away from the seat, locks the movement of the tray 3' towards any other position than the vertical position P1', and particularly towards the horizontal usage position.

In FIG. 1B, the passenger has moved the latch 2' upwards, along the direction of the arrow F', to release the tray 3'. In this case, the locking device 1' no longer holds the tray 3' in the raised position P1', and enables movement of the tray 3' towards another position P2' of the tray, by rotation about the rotation axis X'.

Figures 2A, 2B:
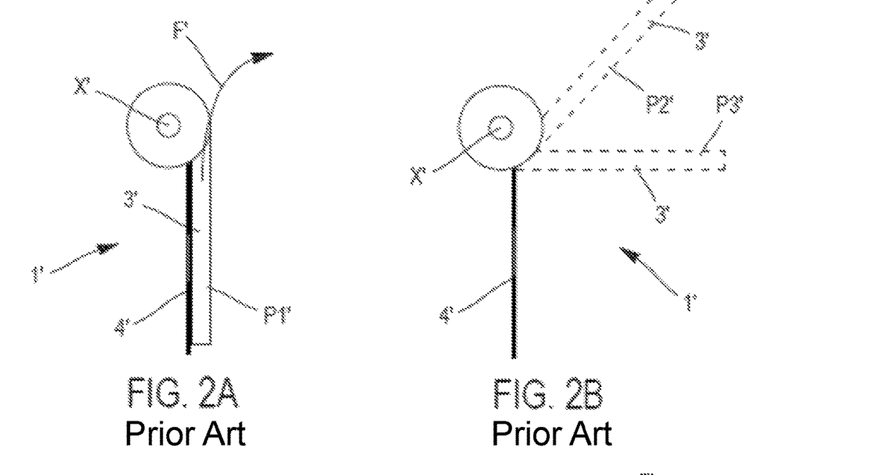
FIGS. 2A and 2B show a second example of a mechanism according to prior art for locking a vehicle seat tray in position.

FIGS. 2A and 2B also show a second example of a locking device 1' using a rail system 4'.

In FIG. 2A, the tray 3' is in a raised position P1' in contact with the back face of the seat back, that actually corresponds to a position in which the passenger has lowered the tray 3' in contact with the back face of the seat back. In this position, the tray 3' is mounted on a rail system 4' free to slide and it has been entirely inserted on the rail system 4' so that it can be stowed. The arrow F' represents the movement that the passenger applies to the tray 3' so that it can be moved into the usage position P3', in other words a vertical movement to raise the tray 3', and then a rotation movement about the rotation axis X' to lower the tray 3'.

In FIG. 2B, the tray 3' has been pulled out from the rail system 4' and rotated about the rotation axis X' to move successively from the position in which it is not used P1', to an intermediate position P2', and then to the horizontal usage position P3'.

Figures 3A, 3B:
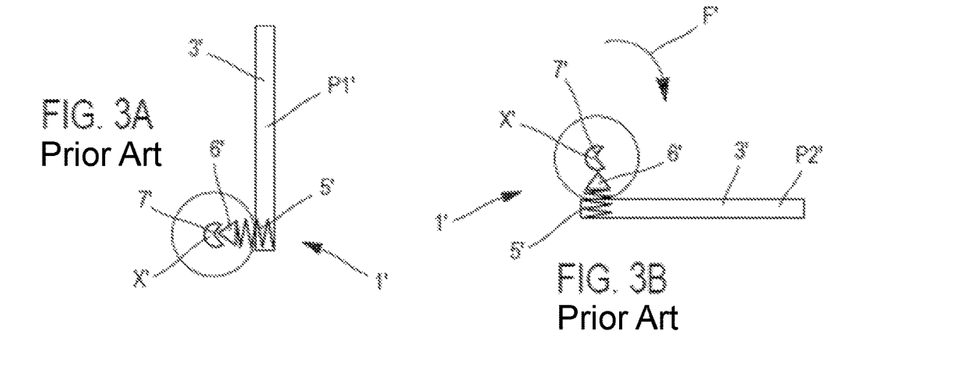
FIGS. 3A and 3B show a third example of a mechanism according to prior art for locking a vehicle seat tray in position.

FIGS. 3A and 3B also show a third example of a locking device 1' using a spring system 5'.

In FIG. 3A, the tray 3' is in a raised position P1', in contact with the back face of the passenger seat. A spring 5' to which a rigid locking element 6' is fixed at one of its ends, is fixed to the tray 3' at its other end. The tray 3' is locked in the vertical position P1' by insertion of the rigid locking element 6' in a notch of an insertion element 7' provided at the rotation axis X' of the tray 3'. In this raised position P1' of the tray 3', the spring 5' is relaxed in the notch of the insertion element 7'.

In FIG. 3B, the passenger has applied a force on the tray 3' along the direction of the arrow F' to move the tray 3' towards its horizontal usage position P2'. To achieve this, rotation of the tray 3' about the rotation axis X' released the rigid locking element 6' in the notch of the insertion element 7' and compression of the spring 5'.

Furthermore, patent application FR 2 831 496 A1 discloses a hinged tray for a vehicle seat. The latch 34 that locks the tray in rotation is installed free to slide in it.

Patent application EP 1 431 112 A1 discloses a retractable table system. A locking part is installed fixed on the rotating tray and it has openings inside which cams penetrate.

These systems are somewhat complex and there are many parts in them.

Furthermore, patent application EP 2 646 318 A1 discloses a folding tray solution combining a rail solution with a horizontal movement of the tray in the extended position, so that the distance of the tray considered from the seat back can be adjusted.

Patent application US 2007/0145791 A1 adds a solution to this horizontal adjustment to connect two horizontal tray elements and to provide horizontal locking between two separate elements that may be stowed separately in the folded position.

Finally, U.S. Pat. No. 6,347,590 B1 discloses a solution for a tray that can be folded into a console, that combines a pivot and rotation to extend the tray. The tray is locked inside the console by preventing rotation, in a manner similar to the solution shown in FIGS. 3A and 3B.

Nevertheless, known solutions according to prior art are not fully satisfactory, particularly in terms of reliability, dimensions, safety, weight and the number of elements in mechanisms for locking folding elements. More particularly, the first example locking mechanism making use of a movable latch and the second example locking mechanism making use of a rail system usually require attachment systems on the structure supporting the tray, that are complex in design and heavy. Furthermore, the third example locking mechanism making use of a spring system does not generally guarantee passenger safety, in particular safety of the passenger sitting on the seat facing the tray. The force necessary to release the tray and to bring it into the usage position is usually fairly low, such that the tray can disengage from the vertical position by itself and strike the passenger, for example during a crash.

DESCRIPTION OF THE INVENTION

Thus, the purpose of the invention is at least to partially satisfy the needs mentioned above and the disadvantages of embodiments according to prior art.

The invention aims particularly at disclosing a mechanism for locking a folding element of a passenger seat in position that is reliable in terms of technical production and safety for the passenger, and that is simple in design, compact and lightweight.

Thus, the purpose of the invention according to one of its aspects is a device for locking a folding element in position, and particularly a tray, for a vehicle seat, characterised in that it comprises:
- a fixed element that will be fixed to said vehicle seat,
- a rotating element that will be fixed to said folding element, installed free to rotate relative to said fixed element about a rotation axis, said rotating element comprising at least a first locking structure,
- a locking element, installed on said fixed element and that can be moved between a locking position in which it locks said rotating element in rotation relative to said fixed element by at least partial engagement of said locking element in said at least one first locking structure of said rotating element, and a release position in which it allows free rotation of said rotating element from said fixed element by release of said locking element in said at least one first locking structure of said rotating element.

With the invention, the number and weight of parts used for locking the folding element in the non-usage position can be significantly reduced. Furthermore, the invention can assure passenger safety, particularly in the case of a crash, because it is more reliable than solutions in prior art. The invention can also reduce the global space occupied by the folding element on the passenger seat. Ergonomics can thus be improved. The invention is particularly advantageous for public transport, particularly by road, rail or air.

The locking device according to the invention may also comprise one or several of the following characteristics taken in isolation or in any technically possible combination.

The first locking structure of the rotating element may be a first opening and/or a locking latch.

The rotating element may be an approximately cylindrical element comprising at least one first locking structure on its lateral surface.

The fixed element may comprise at least one second locking structure, particularly a second opening, through which the locking element can engage.

The first locking structure of the rotating element and/or the second locking structure of the fixed element may at least partly extend along the rotation axis of the rotating element.

The rotating element may be at least partially inserted in the fixed element, or vice versa. The first locking structure and the second locking structure may face each other to enable the locking element to engage through first and second locking structures.

The fixed element may be an approximately cylindrical element.

The device may comprise means of auto-engagement of the locking element in at least the first locking structure of the rotating element, and particularly an elastic return device system and/or a magnetised system, when the locking element is facing the first locking structure during rotation of the rotating element about the rotation axis.

The locking element may be shaped approximately like the arc of a circle, when observed in section in a plane perpendicular to the rotation axis.

The locking element, particularly in the case described above, may be installed free to rotate about a rotation axis offset from the locking element and the rotation axis of the rotating element so that it can be engaged in the first locking structure.

The rotation axis of the rotating element may be a controlled torque rotation axis, particularly including a torsion spring.

Another purpose of the invention according to another of its aspects is a passenger vehicle seat, comprising:
- a seat back with a front face towards the passenger and a back face opposite the front face, and
- a folding element, particularly a tray, towards the back face of the seat back, installed free to pivot relative to the seat back about a rotation axis, so that the folding element can be put into at least two predetermined angular positions, including a raised position in which the folding element is not used;

characterised in that it comprises a device for locking the folding element as defined above in position, to lock the folding element at least in the raised position.

The locking element may comprise an element forming a notch facing the rotating element, when the folding element is in the position in which rotation is locked, the rotating element penetrating into the element forming the notch.

Another purpose of the invention according to another of its aspects, is a vehicle comprising a seat as defined above.

« Vehicle », means any means of transport or displacement of at least one passenger, for example an aircraft, a car, a train, a stroller, a cable car, a chairlift, a boat, a gondola for funfair thrill rides, among others.

The seat and the vehicle according to the invention may comprise any of the characteristics mentioned above, taken in isolation or in any technically possible combination with other characteristics.

BRIEF DESCRIPTION OF THE DRAWINGS

The invention will be better understood after reading the detailed description given below of non-limitative examples of the invention, and an examination of the diagrammatic and partial figures in the appended drawing in which.

In all these figures, identical references may denote identical or similar elements.

Furthermore, the different parts shown in the figures are not necessarily all shown at the same scale, to make the figures more easily understandable.

DETAILED PRESENTATION OF PARTICULAR EMBODIMENTS

FIGS. 1A to 3B have already been described in the part describing the state of prior art.

Example embodiments of the invention are described below with reference to FIGS. 4 to 6B.

Figure 4:
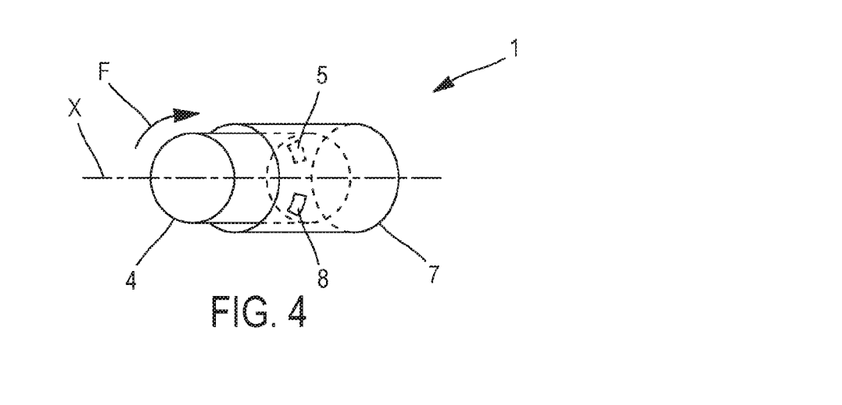
FIG. 4 shows a partial perspective view of an example embodiment of a locking device according to the invention.

FIG. 4 shows a partial perspective view of a first example embodiment of a locking device 1 in position according to the invention. The folding element 2 and the locking element 6 are not shown in this FIG. 1 to facilitate understanding of the invention.

It should be noted that throughout this description, the folding element 2 is preferably a tray 2 of a passenger seat 3, although this is not in any way limitative.

According to the invention, the locking device 1 comprises an element 4 free to rotate about a rotation axis X, that corresponds to the rotation axis X of the tray 2, installed free to pivot relative to the seat back 10.

This rotating element 4 is fixed permanently to the tray 2 such that it can rotate the tray 2 about the rotation axis X.

Advantageously, the rotating element 4 is in the form of a cylinder, particularly a hollow cylinder, that comprises at least a first locking structure in the form of a first opening 5 on its lateral surface. The first opening 5 may correspond to an orifice formed on the rotating element 4. The first opening 5 may or may not open on the edge of the lateral surface of the rotating element 4.

As a variant, although not shown in FIG. 4, the rotating element 4 may comprise a plurality of first openings 5 associated with a plurality of locking elements 6 to lock the tray 2 in position in several angular configurations.

Furthermore, the locking device 1 also comprises a fixed element 7, positioned relative to the rotating element 4 such that the rotating element is at least partially inserted inside the fixed element 7. Thus, the rotating element 4 and the fixed element 7 are inserted one inside the other at the rotation axis X of the tray 2.

Advantageously, the fixed element 7 is also in the form of a cylinder, particularly a hollow cylinder, with a diameter larger than the diameter of the rotating element 4.

This fixed element 7 also comprises at least one second locking structure on its lateral surface in the form of a second opening 8 through which the locking element 6 can engage.

As for the rotating element 4 and as a variant not shown, the fixed element 7 may comprise a plurality of second openings 8 associated with a plurality of locking elements 6 so that the tray 2 can be locked in position in several angular configurations.

The locking device 1 then operates as follows: during rotation of the tray 2, or more particularly of the rotating element 4, along the arrow F, the first 5 and second 8 openings are facing each other. Insertion of the locking element 6 through the first 5 and second 8 openings then locks the tray 2 in position by preventing rotation of the rotating element 4 about the rotation axis X.

The locking element 6 is preferably rigid, and in particular is sufficiently rigid so that the rotation of the rotating element 4 can be prevented regardless of the force applied on the tray 2, particularly in the case of a crash.

The fixed element 7 may be fixed to the seat 3 of a vehicle in various ways, provided that it is fixed relative to the seat 3.

The rotating element 4 may be fixed to the tray 2 in various ways, provided that it is fixed relative to the tray 2.

When the locking element 6 is released from the first 5 and second 8 openings, free rotation of the tray 2 is then possible, particularly to move it into the horizontal usage position.

The locking element 6 may be in various forms. In particular, its length along the rotation axis X may be variable.

Figure 5A:
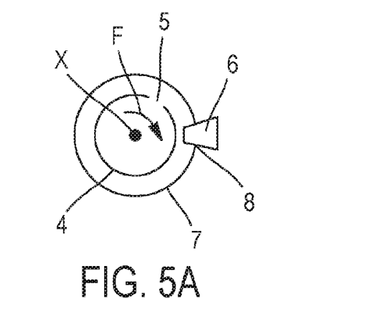
FIGS. 5A to 5C show a sectional view of three steps in the use of an example embodiment of a locking device according to the invention.
Figure 5B:
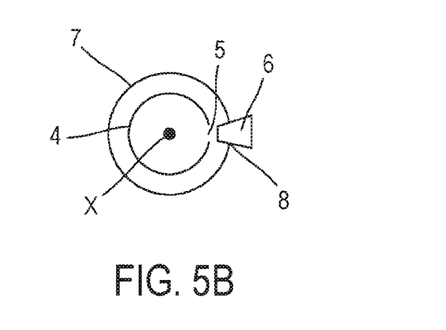
Figure 5C:
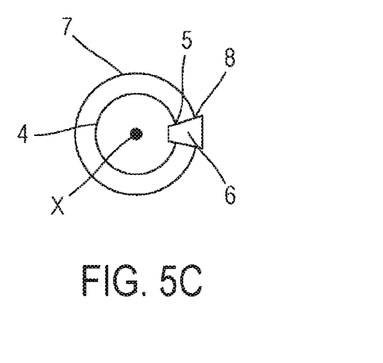

FIGS. 5A to 5C also show three steps for operation of a device 1 according to the invention for locking a tray 2 in position. The locking element 6 can be seen in these figures.

In FIG. 5A, the tray 2 is in a position other than the raised position, in other words the position corresponding to a usage configuration. Thus, the first opening 5 of the rotating element 4 is not located facing the second opening 8 of the fixed element 7.

During rotation of the rotating element 4, in other words during rotation of the tray 2 along the direction of the arrow F as shown in FIG. 5A, the first opening 5 is positioned facing the second opening 8 of the fixed element 7, as shown in FIG. 5B.

It should be noted that the locking element 6 may be installed free to slide relative to the fixed element 7. It may be permanently engaged, at least partially, in the second opening 8 of the fixed element 7 and may move at the time of locking, or it may be located outside the second opening 8 of the fixed element 7 and engage into this second opening 8 at the time of locking.

When the first opening 5 of the rotating element 4 is facing the second opening 8 of the fixed element 7 as shown in FIG. 5B, it is possible to prevent rotation of the rotating element 4 and therefore the tray 2.

As shown in FIG. 5C, the locking element 6 is then completely engaged inside the first 5 and second 8 openings, either by manual action by the passenger or automatically.

In particular, auto-engagement of the locking element 6 through the first 5 and second 8 openings may be achieved by one of the auto-engagement means 9a, 9b of the locking device 1, for example such as an elastic return device system 9a, for example a spring, or also a magnetised system 9b, as shown in FIGS. 8A-8C and 9A-9C respectively, provided between the rotation axis X and the locking element 6. In this way, locking can be done automatically as soon as the first 5 and second 8 openings are aligned.

The trapezoidal shape of the locking element 6 that is actually a truncated cone when seen in a sectional view, is useful because it facilitates insertion of the cylinder connected to the tray into a cylindrical hole. Since adjustments between the two rotating cylinders are imperfect, a purely cylindrical rigid element would require perfect alignment of the two cylinders in rotation.

However, possible vibrations in the seat tend to push the locking element 6 (see arrow F2 in FIG. 5D), which is incompatible with its function. Aeronautical standards impose that the tray should remain locked in the raised position, even during emergency landings.

Figure 5D:
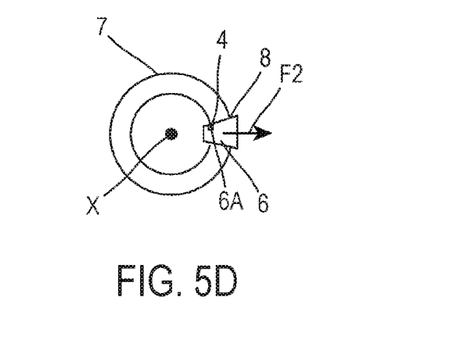
FIG. 5D shows a variant embodiment of the locking device in FIGS. 5A-5C, FIGS. 6A and 6B show a sectional view of two steps in the use of another example embodiment of a locking device according to the invention.
Figure 14:
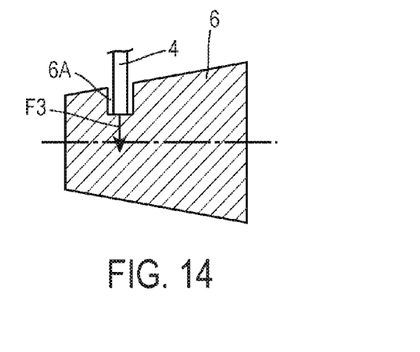
FIG. 14 shows a sectional view of a detail in FIG. 5D.

With reference to FIG. 5D, this solution can be improved by providing an element forming a notch 6A in the locking element 6 placed so that when in the locking position, it is facing the rotating element 4 that then penetrates into the element forming a notch. The force generated by any vibrations is no longer directed along the direction of removal of the locking element 6, but perpendicular to it, because the rotating element 4 strikes the bottom of the element forming the notch 6A (see FIG. 14 and the arrow F3).

Figure 6A:
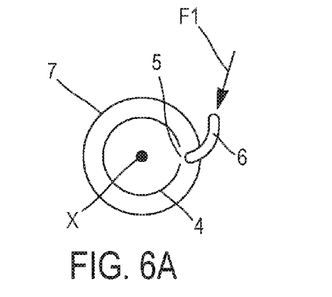
Figure 6B:
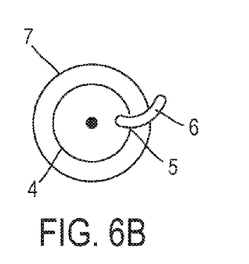

FIGS. 6A and 6B show another variant embodiment of the locking device 1 according to the invention.

In this example, the locking element 6 is approximately shaped like the arc of a circle when seen in section in a plane perpendicular to the rotation axis X.

For example, the locking element 6 may be made of metal.

It is thus in the form of a « bean », that fits through the first 5 and second 8 openings, after a rotation movement about a rotation axis 6B offset from the rotation axis X of the rotating element 4 and the locking element 6, along the arrow F1 in FIG. 6A, so that rotation of the rotating element 4 and therefore the tray 2 can be prevented, as shown in FIG. 6B.

The shape of the locking element 6 can help to optimise its function. In particular, a concave arc of a circle shape is less likely to be released in the case of a sudden movement, for example during a crash, or when the rotating element 4 vibrates.

Figure 6C:
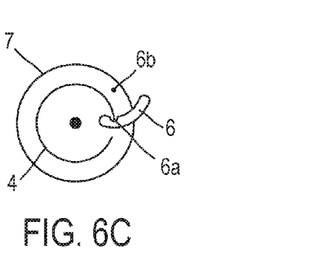
FIG. 6C shows a variant embodiment of the device in FIGS. 6A and 6B, FIGS. 7A and 7B show sectional views of two steps in the use of yet another example embodiment of a locking device according to the invention.

With reference to FIG. 6C, the locking device 1 may also comprise an element forming a notch 6A, associated with the use of the locking element 6, to increase the locking strength of the tray 2 in the raised position. The rotating element 4 of the tray 2 is then inserted into the element forming the notch 6A when the tray is in its raised out-of-use position. In particular, in order to lock the tray 2, the passenger can raise the tray 2 beyond its raised position to insert it into the element forming the notch and activate the locking element 6 manually to lock the tray 2 in position, or not activate it manually if the locking element 6 has an automatic locking mechanism. Similarly, the passenger can raise the tray 2 to release the tray 2 from the element forming the notch and activate the locking element 6 manually, or not if the mechanism is automatic.

Figure 7A:
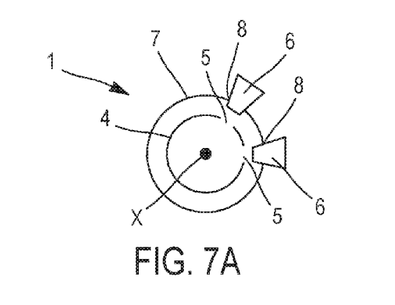
Figure 7B:
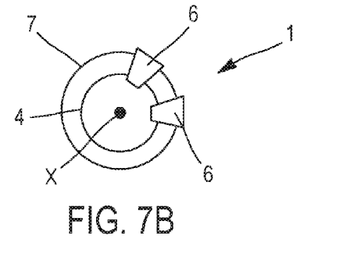

FIGS. 7A and 7B also show another variant embodiment of the locking device 1 according to the invention.

FIG. 7A shows a release configuration of the locking device 1 in which free rotation is possible between the rotating element 4 and the fixed element 7, while FIG. 7B shows a locking configuration of the locking device 1 in which the rotating element 4 cannot rotate relative to the fixed element 7.

In this variant, unlike the example embodiment in FIGS. 5A to 5C, the locking device 1 comprises two locking elements 6 that can engage into two first openings 5 in the rotating element 4 and two second openings 8 in the fixed element 7, respectively. It is thus possible to prevent rotation of the rotating element 4 relative to the fixed element 7 for different angular configurations, particularly for different positions of the tray 2.

Figure 8A:
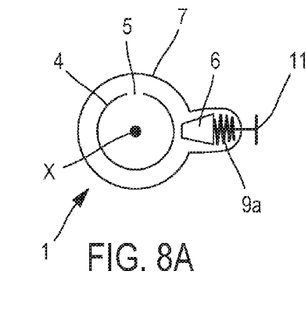
FIGS. 8A to 8C show sectional views of three steps in the use of another example embodiment of a locking device according to the invention, with the use of an elastic return device system.
Figures 8B, 8C:
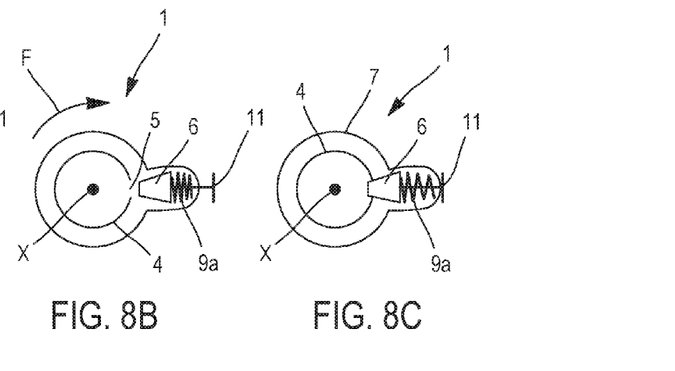

FIGS. 8A to 8C also show three steps in the embodiment of another example of the locking device 1 according to the invention.

In this example, the locking device 1 comprises auto-engagement means composed of an elastic return device system 9a, and more precisely a spring 9a.

In FIG. 8A, the spring 9a is compressed in contact with the lateral surface of the rotating element 4.

As can be seen in FIG. 8B, rotation of the rotating element 4 along the arrow F relative to the fixed element 7 can bring the first opening 5 in line with the locking element 6 supported on the spring 9a.

Then, as shown in FIG. 8C, relaxation of the spring 9a inserts the locking element 6 in the first opening 5 of the rotating element 4, therefore locking the tray 2 in position.

Furthermore, a gripping device 11 is provided at the opposite end of the spring 9a, the assembly composed of the gripping device 11, the spring 9a and the locking element 6 being fixed such that the passenger can pull on the gripping device 11 to release the device 1, by disengaging the locking element 6 from the first opening 5.

Figure 9A:
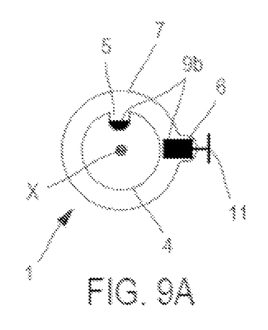
FIGS. 9A to 9C show sectional views of three steps in the use of another example embodiment of a locking device according to the invention, with the use of a magnetised system.
Figure 9B:
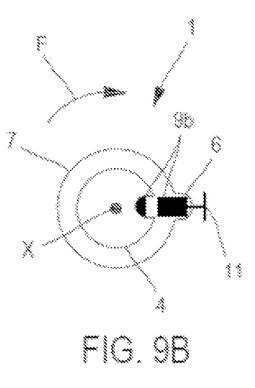
Figure 9C:
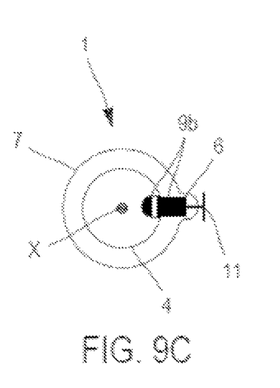

FIGS. 9A to 9C also show three steps in use of another example of the locking device 1 according to the invention.

In this example, the locking device 1 comprises auto-engagement means formed by a magnetised system 9b, and more precisely by a magnetised system 9b comprising a first magnet housed in the first opening 5 of the rotating element 4 and a second magnet formed by the locking element 6.

In FIG. 9A, the magnetised locking element 6 is set back from the lateral surface of the rotating element 4.

Then, as can be seen in FIG. 9B, rotation of the rotating element 4 relative to the fixed element 7 along the direction of arrow F moves the first opening 5 containing the first magnet of the magnetised system 9b in line with the magnetised locking element 6.

Then, as shown in FIG. 9C, attraction of the magnetised locking element 6 towards the first magnet housed in the first opening 5 of the rotating element 4 enables the locking element 6 to be inserted into the first opening 5 of the rotating element 4, and therefore locking of the tray 2 in position.

Furthermore, as for the example embodiment shown in FIGS. 8A to 8C, a gripping device 11 is provided at the opposite end of the locking element 6 such that the passenger can pull the gripping device 11 to release the device 1, by disengaging the locking element 6 from the first opening 5.

Figure 10:
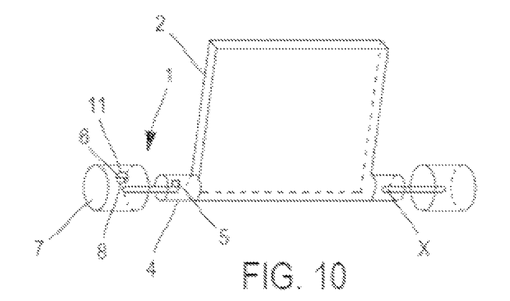
FIG. 10 shows a perspective view of an example locking device according to the invention, fixed to a folding element of a passenger seat.

FIG. 10 shows a perspective view of an example locking device 1 according to the invention, fixed on a tray 2 of a passenger seat 3.

As can be seen, the locking device 1 may for example be provided outside the tray 2, particularly on only one side of the tray 2. As a variant, the locking device 1 might be located inside the tray 2, or two locking devices 1 might be provided with one on each side of the tray 2.

The locking device 1 thus comprises a rotating element 4 fixed to the tray 2, such that the tray 2 and the rotating element 4 are rotated about the rotation axis X.

Furthermore, the fixed element 7 of the locking device 1 is fixed to the passenger seat 3, and is inserted at least partially with the rotating element 4. In particular, the fixed element 7 is located outside the rotating element 4.

The fixed element 7 also comprises, a second opening 8 on its lateral surface, through which the locking element 6 can slide. Similarly, the rotating element 4 comprises a first opening 5, and when the first 5 and second 8 openings are brought in line by rotating the tray 2 about the X axis, the locking element 6 can be inserted through the two openings 5 and 8 to lock the tray 2 in position.

As disclosed above, a gripping device 11 may also be provided at one end of the locking element 6 so that the locking device 1 can be unlocked.

Figure 11:
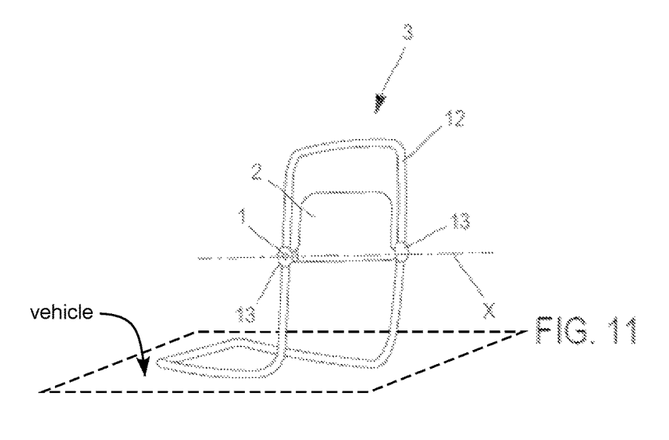
FIG. 11 shows a perspective view of an example seat for a vehicle according to the invention.

FIG. 11 also shows a perspective view of an example seat 3 for a vehicle according to the invention.

The seat 3 comprises a seat structure 12 and a folding tray 2.

The tray 2 is fixed to the seat structure 12 through two latching rings 13 located on each side of the tray 2.

According to the invention, at least one of the latching rings 13 may comprise a locking device 1 according to the invention. In this case, the passenger can lock the tray 2 in the raised position by using the locking device 1, in particular by actuation of a device 11 for gripping the locking device 1.

FIGS. 12A to 12D also show sectional views of four steps in the use of another example embodiment of the locking device 1 according to the invention.

In this example, the first locking structure 5 of the rotating element 4 is in the form of a locking latch 5. The locking element 6 also comprises a locking notch 14 into which the locking latch 5 can be engaged.

Figure 12A:
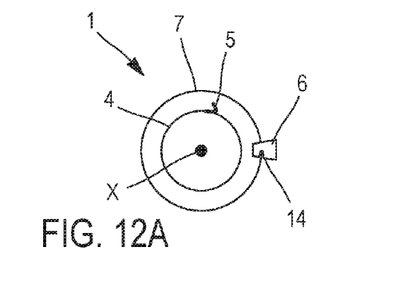
FIGS. 12A to 12D show sectional views of four steps in the use of yet another example embodiment of a locking device according to the invention.
Figure 12B:
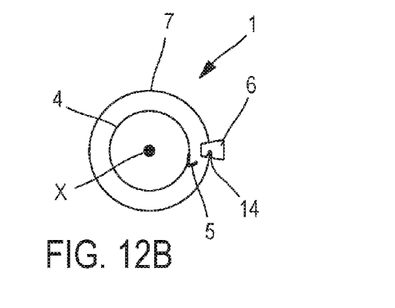

The difference between the configurations in FIGS. 12A and 12B is that the rotating element 4 has rotated about the rotation axis X such that the locking latch 5 is brought approximately in line with the locking element 6, the locking latch 5 facing the locking notch 14.

Figure 12C:
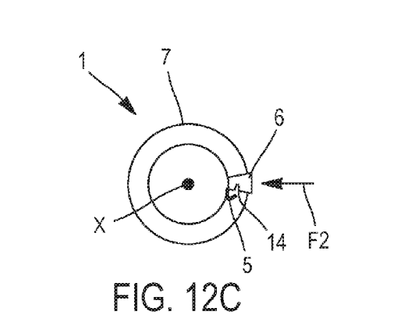

Thus, as shown in FIG. 12C, the locking element 6 is actuated along the direction of the arrow F2 to bring the locking element 6 into contact with the lateral surface of the rotating element 4 and to bring the locking notch 14 in line with the locking latch 5.

Figure 12D:
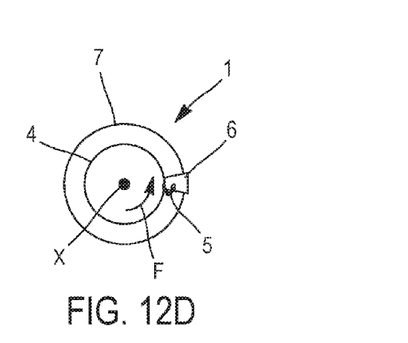

Then, as shown in FIG. 12D, rotation of the rotating element 4 along the direction of the arrow F can finish insertion of the locking latch 5 into the locking notch 14 of the locking element 6 to hold the tray 2 in the locked position.

Figure 13:
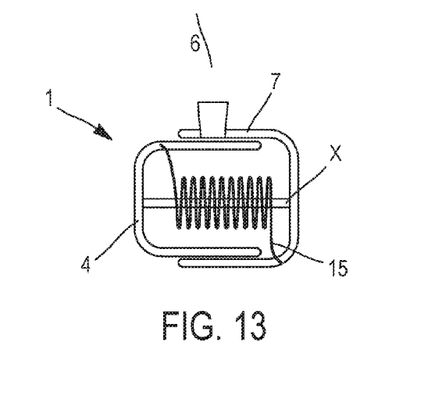
FIG. 13 shows a sectional view and a front view of another example embodiment of a locking device according to the invention.

FIG. 13 also shows a sectional view and a front view of another example embodiment of a locking device 1 according to the invention.

In this example, the rotation axis X is a controlled torque rotation axis. In particular, it comprises an elastic return device, particularly a torsion spring 15.

The presence of such a torsion spring 15 can make it possible to more accurately adjust the dynamics of the tray 2 as it opens, and to provide the passenger with a more pleasant feeling that the locking device 1 mechanism has good control over the movement.

Controlled torque of the rotation axis X can prevent the tray 2 from suddenly and quickly dropping, when it is vertical (in the raised out-of-use position) but no longer locked by the locking device 1, while the torsion spring 15 enables easy disengagement of the tray 2 once the locking element 6 is disengaged from the locking structure 5.

Thus, when the tray 2 is released, the torsion spring 15 is released and pushes the tray 2 into the horizontal usage position. The controlled torque rotation axis X prevents movement of the tray 2 from being too sudden; a controlled friction torque resists the initial thrust of the torsion spring 15, and then the weight of the tray 2.

The principle of a plunger pin and/or hinge can be used to make the locking system composed of the locking element 6 and at least the first locking structure 5 of the rotating element 4 in which the locking element 6 can engage. The plunger pin is a cylinder coupled to a spring that can be depressed by pressure from the spring, and released by the user pulling on it and retensioning the spring at the same time. The plunger pin thus enables an embodiment as shown in FIGS. 8A-8C, with a rigid locking element 6 coupled to a spring 9a, and a gripping device 11 for the user that can be formed directly by the rigid locking element 6.

The hinge can advantageously replace the rotation axis X firstly by adding torque control that prevents sudden dropping of the tray 2 once released from the rigid locking element 6. Constant friction enables smooth dropping of the tray 2 and better comfort of use for the passenger. A torsion spring can be added to this controlled torque hinge, making it easier to open the tray 2; as soon as the rigid locking element 6 (for example the plunger pin) is raised, the tray 2 is opened by an angle of 10° or more, preventing the tray 2 from being locked by the plunger pin when the plunger pin is released. This torsion spring thus makes it possible to open the tray 2 with a single hand, and provides better comfort for the passenger. This embodiment should be compared with that disclosed with reference to FIG. 13.

The fact that the locking element 6 is installed free to move in the fixed element 7 means that it can only be reached by a user when it is in a fixed position chosen such that inadvertent access to the locking element 6 is not possible.

With the system shown in FIGS. 3A and 3B, the tray may be actuated accidentally or inadvertently due to an inappropriate movement of a user, for example during evacuation from the vehicle, because the system is installed in or on the tray 3, in at least two inclination portions of the tray.

Obviously, the invention is not limited to the example embodiments that have just been disclosed. Those skilled in the art can make various modifications to it.

The expression « comprising a » should be understood as being synonymous with « comprising at least one », unless specified otherwise.

What is claimed is:
1. A vehicle seat, comprising:
a seat back with a front face towards the passenger and a back face opposite the front face, and
a folding element, particularly a tray, towards the back face of the seat back, installed free to pivot relative to the seat back about a rotation axis, so that the folding element can be put into at least two predetermined angular positions, including a raised position in which the folding element is not used,
a device for locking the folding element in position, wherein the device comprises:
a fixed element, designed to be fixed to said vehicle seat back,
a rotating element, fixed to said folding element, at least partially inserted in the fixed element and installed free to rotate relative to said fixed element about the rotation axis, said rotating element comprising at least a first locking structure, a locking element, installed on said fixed element and that can be moved between a locking position in which the locking element locks said rotating element in rotation from said fixed element by at least partial engagement of said locking element in said at least one first locking structure of said rotating element, and a release position in which the locking element allows free rotation of said rotating element from said fixed element by release of said locking element in said at least one first locking structure of said rotating element.

2. The vehicle seat according to claim 1, wherein the first locking structure of the rotating element is a first opening.

3. The vehicle seat according to claim 1, wherein the rotating element is cylindrical and that the at least a first locking structure is located on the lateral surface of the rotating element.

4. The vehicle seat according to claim 1, wherein the fixed element comprises at least a second locking structure through which the locking element can engage.

5. The vehicle seat according to claim 4, wherein the rotating element is at least partially inserted in the fixed element, such that the first locking structure and the second locking structure are capable of facing each other to enable the locking element to engage through first and second locking structures.

6. The vehicle seat according to claim 4, wherein the fixed element is cylindrical.

7. A vehicle seat according to claim 4, wherein the second locking structure is a second opening.

8. The vehicle seat according to claim 1, wherein the device comprises auto-engagement means causing the locking element to engage into the at least the first locking structure of the rotating element when the locking element is facing the first locking structure during rotation of the rotating element about the rotation axis.

9. A vehicle seat according to claim 8, wherein the auto-engagement means is an elastic return device system comprising a spring in contact with the lateral surface of the rotating element.

10. A vehicle seat according to claim 8, wherein the auto-engagement means is a magnetised system comprising a first magnet housed in the at least a first locking structure and a second magnet formed by the locking element.

11. The vehicle seat according to claim 1, wherein the locking element is shaped in the form of an arc of a circle, when observed in section in a plane perpendicular to the rotation axis.

12. The vehicle seat according to claim 1, wherein the locking element is installed free to rotate about a rotation axis offset from the rotation axis of the locking element and from the rotation axis of the rotating element so that the locking element can be engaged in the first locking structure.

13. The vehicle seat according to claim 1, wherein the rotation axis of the rotating element is a controlled torque rotation axis, this rotation axis particularly including a torsion spring.

14. The vehicle seat according to claim 1, wherein the locking element comprises an element forming a notch facing the rotating element, when the folding element is in a position in which rotation is locked, the rotating element penetrating into the element forming the notch.

15. A vehicle comprising a vehicle seat according to any one of the preceding claims.

16. A vehicle seat according to claim 1, wherein the first locking structure of the rotating element is a locking latch.

* * * * *